(12) United States Patent
Chang et al.

(10) Patent No.: US 6,757,451 B2
(45) Date of Patent: Jun. 29, 2004

(54) OPTICAL CIRCULATOR

(75) Inventors: Kok-Wai Chang, Los Altos, CA (US); Kuochou Tai, Fremont, CA (US); Jyehong Chen, Mt. Holly, NJ (US); Qingdong Quo, Sunnyvale, CA (US)

(73) Assignee: JDS Uniphase Corporation, San Jose, CA (US)

( * ) Notice: Subject to any disclaimer, the term of this patent is extended or adjusted under 35 U.S.C. 154(b) by 289 days.

(21) Appl. No.: 10/082,778

(22) Filed: Feb. 25, 2002

(65) Prior Publication Data

US 2002/0168128 A1 Nov. 14, 2002

Related U.S. Application Data (60) Provisional application No. 60/270,905, filed on Feb. 26, 2001.

(51) Int. Cl.⁷ ............................ G02B 6/00; G02B 27/28; G02B 5/30
(52) U.S. Cl. .......................................... 385/11; 359/497
(58) Field of Search ...................... 385/11; 359/483–502

(56) References Cited

U.S. PATENT DOCUMENTS

| | | | | |
|---|---|---|---|---|
| 5,204,771 A | * | 4/1993 | Koga ........................... | 359/281 |
| 5,471,340 A | * | 11/1995 | Cheng et al. ................ | 359/281 |
| 5,909,310 A | * | 6/1999 | Li et al. ....................... | 359/484 |
| 5,930,039 A | | 7/1999 | Li et al. | |
| 6,154,581 A | * | 11/2000 | Lu et al. ........................ | 385/11 |
| 6,285,499 B1 | * | 9/2001 | Xie et al. .................... | 359/484 |
| 6,310,989 B1 | * | 10/2001 | Liu ............................... | 385/11 |
| 6,339,661 B1 | * | 1/2002 | Kokkelink et al. ........... | 385/11 |
| 6,438,278 B1 | * | 8/2002 | Liu et al. ...................... | 385/11 |
| 2002/0071181 A1 | * | 6/2002 | Frisken ....................... | 359/484 |

OTHER PUBLICATIONS

"An Automatic 40–Wavelength Channelized Equalizer" By C.R. Doerr et al., IEEE Photonics Technology Letters, vol. 12, No. 9, Sep. 2000.

* cited by examiner

*Primary Examiner*—Akm Enayet Ullah
*Assistant Examiner*—Michelle R. Connelly-Cushwa
(74) *Attorney, Agent, or Firm*—Allen, Dyer, Doppelt, Milbrath & Gilchrist, P.A.

(57) ABSTRACT

An optical circulator with a first, second, third, and fourth port. The second and third port are disposed to receive polarized light entering the circulator as unpolarized light from the first port. The fourth port is disposed to receive unpolarized light entering the circulator as polarized light from the second and third port. The circulator comprises a beam-splitting and -combining element for separating and combining mutually orthogonal polarizations and a non-reciprocal polarization rotator. The circulator can be used to furnish light of a desired predetermined polarization for polarization-dependent devices.

29 Claims, 5 Drawing Sheets

OPTICAL CIRCULATOR

This application claims priority from U.S. Provisional Application No. 60/270,905 filed Feb. 26, 2001.

FIELD OF THE INVENTION

This invention relates to non-reciprocal couplings for optical fibers, and more particularly, to an optical circulator.

BACKGROUND OF THE INVENTION

An optical circulator is a non-reciprocal optical device which directs light entering one port to the next higher number port. Thus, light launched into a first port propagates to, and exits through a second port; however, optical signals launched into the second optical port are blocked from reaching the first port and are directed to a third sequential port. Thus, optical circulators, generally, allow signals to travel in only one direction between any two ports.

In a closed circulator, light transmitted into the third (or other highest number port) is passed to the first port. In an open three port circulator, light directed into the third port is extinguished within the circulator without being transmitted to any other active port.

Examples of circulators known in the art are described in U.S. Pat. No. 5,909,310 to Li et al. (Jun. 1, 1999) and U.S. Pat. No. 5,930,039 to Li et al. (Jul. 27, 1999), both of which are incorporated herein by reference.

For certain applications, which employ polarization-dependent devices requiring polarized light in a known polarization state, commercially available known circulators suffer from the disadvantage that the light that emerges from the ports is unpolarized. These applications require the use of additional components aside from the circulator to produce the polarized beams which are required. For example, in C. R. Doerr et al., IEEE Photonics Technology Letters, Volume 12, Number 9, September 2000, incorporated by reference herein, a channelized equalizer is described requiring only one polarization on the chip. The setup requires a polarization beam splitter (PBS) in addition to a circulator for proper functioning.

It would be useful to have the light that exits and enters at least one port of an optical circulator split into two linearly polarized beams, such as along orthogonal or parallel axes. The advantage of such a circulator is that a device which is polarization-dependent can be connected between the two beams at this port so that only light of a desired predetermined polarization passes through the device.

SUMMARY OF THE INVENTION

It is an object of the present invention to provide an improved optical circulator.

Thus, in one aspect, the invention provides an optical circulator comprising a plurality of ports, wherein an input port is disposed to launch unpolarized light into the circulator, two sequential ports are disposed to receive polarized light, and an exit port is disposed to receive unpolarized light; a beam-splitting and -combining element, configured to split a beam of light propagating in a forward direction along a first light path, into a second and a third light path, the second and third light paths having mutually-orthogonal polarization, said splitting/combining element also configured to combine mutually-orthogonally-polarized light beams propagating in the reverse direction along a fourth and a fifth light path into a single beam of light propagating along a sixth light path; and a non-reciprocal polarization rotator, configured to rotate polarization directions of light propagating along the second and third light paths and to rotate polarization directions of light propagating along the fourth and fifth light paths.

In another aspect, the invention provides a method for circulating and polarizing light. The method comprises providing a plurality of ports, wherein an input port is disposed to launch unpolarized light into the circulator, two sequential ports are disposed to receive polarized light, and an exit port is disposed to receive unpolarized light; splitting a beam of light propagating in a forward direction along a first light path, into a second and a third light path, the second and third light paths having mutually-orthogonal polarization; non-reciprocally rotating the polarization directions of light propagating along the second and third light paths; combining mutually-orthogonally-polarized light beams propagating in the reverse direction along a fourth and a fifth light path into a single beam of light propagating along a sixth light path; and non-reciprocally rotating polarization directions of light propagating along the fourth and fifth light paths.

BRIEF DESCRIPTION OF THE DRAWINGS

The invention may be more completely understood in consideration of the following detailed description of various embodiments of the invention in connection with the accompanying drawings, in which.

DESCRIPTION OF PREFERRED EMBODIMENTS OF THE INVENTION

Circulators in accordance with the invention have four or more ports and are configured such that unpolarized light launched into one port will emerge as polarized light at two sequential ports. Polarized light launched into the two sequential ports will exit the circulator as unpolarized light from another port.

For instance, a four port circulator in accordance with the invention may be configured such that light entering the circulator from a first port will emerge as two separate polarized beams, one polarized beam emerging at a second port and the other polarized beam emerging at a third port. Two polarized beams which enter the circulator from the second and third ports emerge as one unpolarized beam at a fourth port. The beams of light emerging or entering at the second and third ports may have their polarizations oriented as desired with respect to each other, for example orthogonally or perpendicularly to each other.

The circulators of the present invention do not require the use of components having epoxied surfaces in the beam path. However, epoxied component may be used with the present invention, if desired.

The circulators include two major components, namely a beam-splitting/-coupling module and a non-reciprocal polarization rotator. The beam-splitting/-coupling module of the circulators of the present invention functions to either separate an incoming unpolarized light beam into outgoing beams of orthogonal polarization or combine incoming beams from of orthogonal polarization into an unpolarized light beam. The beam-splitting/-coupling module may be fabricated from birefringent crystals or be formed by using other polarization beam splitters (PBS) which are readily known from the art, such as polarization separation coatings (dielectric coatings).

Birefringent crystals differ from other transparent materials in that they have different indices of refraction in different directions, meaning that different polarizations of light will refract by different amounts. As a result, an unpolarized light beam that enters a birefringent crystal at an angle to the optical axis of the crystal is split into two orthogonally-polarized components, an ordinary ray and an extraordinary ray, with different refractive indices. The ordinary ray behaves in accordance with Snell's Law; however, the extraordinary component does not. The direction that the extraordinary component is diverted is referred to as the walk-off direction of the crystal. Thus, rays with their planes of polarization parallel to the walk-off direction will be refracted in the walk-off direction; however rays with planes of polarization orthogonal to the walk-off direction will be unchanged in the walk-off direction. Birefringent crystals may be formed from any suitable birefringent material, such as calcite, rutile, crystalline quartz, lithium niobate, and yttrium orthovanadate ($YVO_4$).

The term, non-reciprocal polarization rotator, is intended to cover devices which transform polarization from one state to another for beam propagation in one direction but do not transform polarization in the same manner for beam propagation in the reverse direction. Examples of examples of non-reciprocal polarization rotators include Faraday rotators, or combinations of Faraday rotators and half wave plates.

Faraday rotators typically include a transparent material, having a high Verdet constant, that is coupled to a magnet. The magnet produces a magnetic field having a component parallel to the direction of propagation of light within the Faraday rotator. They rotate the plane of polarization of light in the same direction when light is passed through the Faraday rotator in either direction. Thus, a light beam travelling through and then returning through a given Faraday rotator is not returned to its original polarization, but has its polarization rotated by twice the angle of rotation of the Faraday rotator.

Materials with high Verdet constants used in Faraday rotators include, for example, bismuth-terbium iron garnets, which are often used in Faraday rotators operating at wavelengths in the range 1.3 μm to 1.55 μm. Other materials are available for other wavelength ranges. Furthermore, other materials are available that do not require the use of an external magnet, for example bismuth-substituted rare-earth iron garnets.

Figure 1A:
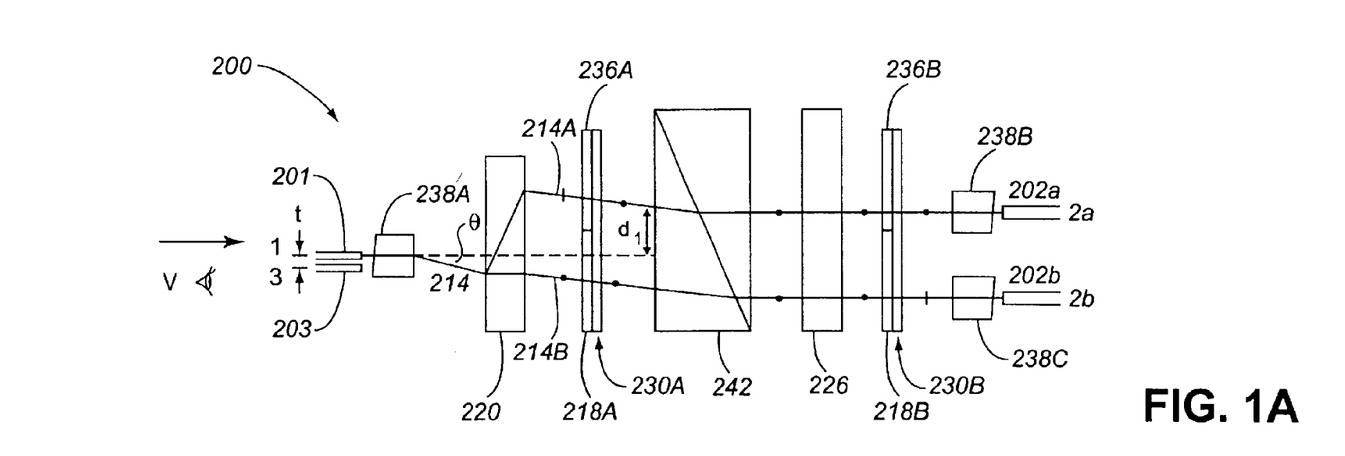
FIGS. 1A and 1B illustrate a side view of a circulator in accordance with another embodiment of the invention, FIG. 1A showing a forward beam path through the device and FIG. 1B showing a reverse beam path through the device.
Figure 1B:
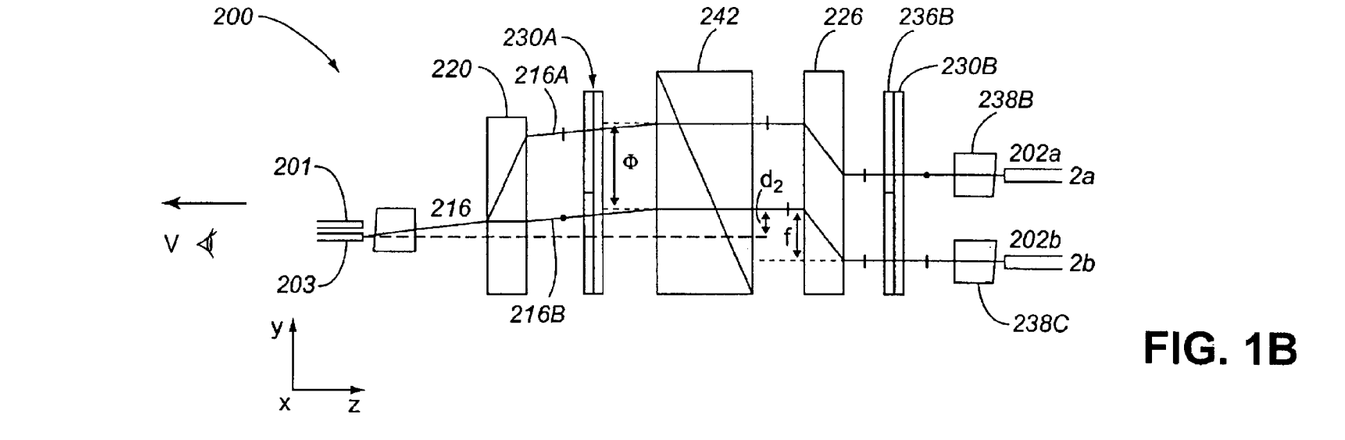

FIGS. 1A and 1B show a circulator 200 according to one aspect of the invention. This circulator includes a beam-splitting/-coupling module (as birefringent crystal 202) and a non-reciprocal polarization rotator (as Faraday rotators 230A and 230B). A two-stage circulator is used to improve isolation and to prevent dispersion-related problems.

Waveguide 201 emits a light beam 214 from port 1 that is collimated by a first lens 238A. Lens 238A also causes beam 214 to make an angle θ with respect to the z-axis. Preferably, lens 238A is a graded index (GRIN) lens.

Use of first collimator lens 238A is not intended to limit the invention. For instance, each waveguide may be provided with its own individual collimating lens, or a more complex arrangement of lenses may be used. Further, the angle θ produced by the GRIN lens is not a necessary feature of the invention, but is merely a result of the type of lens used, as well as the fact that only one collimating lens is used for both waveguides 201 and 203, rather than each waveguide being provided with its own collimating lens.

Beam 214 then passes through a first birefringent crystal 220 which functions as the beam-splitting/-coupling module. Beam 214 is divided into two beams having orthogonal polarizations, specifically beams 214A and 214B, corresponding to the extraordinary and ordinary rays, respectively, by the birefringent crystal 220. Beam 214A is polarized along the x-axis (out of the page); this polarization is indicated by a dot in FIG. 2A. Beam 214B is polarized in the y-z plane; this polarization is indicated by a line segment. The length of birefringent crystal 220 is adjusted to obtain a spatial separation between beams 214A and 214B which permits them to pass through independent optical elements.

Reciprocal rotators operate to rotate the plane of polarization of light passed through it. In the embodiment shown in FIGS. 1A and 1B, the reciprocal rotators are half wave plates 236A, 236B, 218A, and 218B. A half wave plate is a reciprocal device that rotates the plane of polarization of light based on the direction which light is passed through it. The degree of rotation is determined by the acute angle between the half wave plate principal plane and an electric field vector of linearly polarized incident light. As such, a half wave plate rotates the polarization plane through an angle that is twice the acute angle. Beam 214A enters a first half wave plate 236A. First half wave plate 236A rotates the plane of polarization of beam 214A by 45° (acute angle= 22.5°) clockwise with respect to viewpoint V. Beam 214A then passes through a Faraday rotator 230A, which again rotates the plane of polarization by 45° clockwise with respect to viewpoint V. The net effect of half wave plate 236A and Faraday rotator 230A (the first a reciprocal device and the second a non-reciprocal device), therefore, is to rotate the polarization of beam 214A by 90° in the clockwise direction with respect to viewpoint V. Beam 214B, meanwhile, enters a second half wave plate 218A, positioned below first half wave plate 236A. Second half wave plate 218A rotates the plane of polarization by 45° in the counterclockwise direction with respect to viewpoint V, i.e., half wave plate 218A effects a rotation in the opposite direction to half wave plate 236A. Beam 214B then enters the first Faraday rotator 230A which rotates the plane of polarization by 45° in the clockwise direction with respect to viewpoint V. The net effect of half wave plate 218A and Faraday rotator 230A (the first a reciprocal device and the second a non-reciprocal device), therefore, is to leave the polarization of beam 214B unaltered. Therefore, after passing through half wave plate 218A and Faraday rotator 230A, the polarization of beam 214B is in the x-direction, or parallel to the polarization of beam 214A. Thus, half wave plates 236A and 218A, together with Faraday rotator 230A, render two orthogonal polarizations parallel to each other.

At this point beams 214A and 214B still propagate at angle θ with respect to the z-axis as they exit rotator 230A.

This angle of propagation is changed by an angle modifier 242, exemplified here as polarization-dependent prism, namely a Wollaston prism. Wollaston prisms are composed of two birefringent plates. The optical axes of the two birefringent plates are at right angles to each other. The first birefringent plate of the angle modifier 242 has an optic axis OA1 that is oriented parallel to the x-axis. Therefore beams 214A and 214B are viewed as extraordinary rays in the first birefringent plate of angle modifier 242, and are therefore refracted according to the extraordinary index of refraction $n_e$. The second birefringent plate of angle modifier 242 has an optic axis OA2 that is parallel to the y-axis, so beams 214A and 214B are ordinary rays within the second birefringent plate. Therefore beams 214A and 214B are refracted upon passing from the first birefringent plate to the second birefringent plate because of the difference between indices of refraction $n_e$ and $n_o$.

Beams 214A and 214B exit angle modifier 242 and enter a second birefringent crystal 226. The optical axis of crystal 226 is oriented such that beams 214A and 214B are ordinary rays in crystal 226 and thus remain undeflected.

Next, beam 214A passes through a half wave plate 236B which rotates the polarization 45° clockwise with respect to viewpoint V. Beam 214A then enters Faraday rotator 230B which rotates the plane of polarization of beam 214A by 45° counterclockwise with respect to viewpoint V. Consequently, half wave plate 236B and rotator 230B together have no net effect on the polarization of beam 214A, which remains polarized in the x-direction. Meanwhile, beam 214B enters a half wave plate 218B which rotates the plane of polarization of beam 214B by 45° counterclockwise with respect to viewpoint V. Beam 214B then passes through the Faraday rotator 230B which rotates the polarization by another 45° counterclockwise with respect to viewpoint V. Beam 214B is now polarized in the y-direction (indicated by a line segment in the figure). Half wave plates 236B and 218B and Faraday rotator 230B together render two parallel polarizations perpendicular to each other.

Beam 214A is focused by a second lens 238B (preferably a GRIN lens) and enters waveguide 202a. Beam 214B is focused by a third lens 238C (preferably a GRIN lens) and enters waveguide 202b.

Thus, the result of the optical sequence is to transform an unpolarized beam of light entering the circulator from port 1 into two polarized beams of light, which are spatially separated, and can enter two ports 2a and 2b.

In this case, the light beams 214A and 214B exit at ports 2a and 2b as orthogonally polarized beams with respect to each other. However, the beams may be oriented in any desired position with regard to each other, such as in parallel polarizations, by the addition of one or more additional reciprocal rotators in the path of one or both light beams as discussed with regard to circulator 100. Alternatively, half wave plates 218B and 236B may be removed.

Light entering the circulator from ports 2a and 2b must be channeled into port 3. This reverse sequence is shown in FIG. 1B. Beams 216A and 216B exit from ports 2a and 2b, respectively, through waveguides 202a and 202b, respectively. Beam 216A is polarized in the x-direction and beam 216B is polarized in the y-direction, as indicated in FIG. 1B. The beams 216A and 216B are collimated by lenses 238B and 238C, respectively.

Beam 216A enters Faraday rotator 230B, which rotates the polarization of beam 216A by 45° counterclockwise with respect to viewpoint V. Then beam 216A enters half wave plate 236B, which rotates the polarization of beam 216A by another 45° counterclockwise with respect to viewpoint V, (i.e. as the half wave plate is a reciprocal device, the polarization is rotated in the opposite direction to the direction the polarization of beam 214A was rotated coming through half wave plate 236B). Meanwhile the polarization of beam 216B is rotated by 45° counterclockwise with respect to viewpoint V by Faraday rotator 230B. The polarization of beam 216B is then rotated back 45° clockwise with respect to viewpoint V by half wave plate 218B. Therefore, just before beams 216A and 216B enter birefringent crystal 226, they are both polarized in the y-direction.

Here the non-reciprocal nature of circulator 200 is already clear, since if beams 216A and 216B were to exactly retrace the paths of beams 214A and 214B (FIG. 1A), they should be polarized in the x-direction. The origin of the non-reciprocity is the Faraday rotator 230B, whose direction of polarization rotation does not reverse with the change in direction of light propagation.

Beams 216A and 216B enter birefringent crystal 226, where they are extraordinary rays and are offset by a distance f.

Both beams 216A and 216B then enter the angle modifier 242. Beams 216A and 216B first enter the second birefringent plate of the angle modifier 242. The optic axis OA2 of this second birefringent plate is parallel to the polarizations of beams 216A and 216B. Beams 216A and 216B are therefore extraordinary rays within this second birefringent plate, but are undeflected since they are normally incident upon the second birefringent plate.

Upon leaving the second plate and entering the first plate, however, beams 216A and 216B become ordinary rays, since their polarizations are perpendicular to the optic axis OA1 of the second plate. Beams 216A and 216B therefore refract upon entering the first plate due to the difference between refraction indices $n_e$ and $n_o$. When beams 216A and 216B exit this first birefringent plate, they refract again to exit at angle $\phi$ with respect to the z-axis.

After leaving angle modifier 242, beam 216A then passes through Faraday rotator 230A and half wave plate 216A with no net effect on its polarization. Beam 216B passes through Faraday rotator 230A which rotates the polarization by 45° clockwise with respect to viewpoint V and half wave plate 218A which rotates the polarization by 45° with respect to viewpoint V; the result is a rotation of the polarization of beam 216A by 90°. Beams 216A and 216B now have orthogonal polarizations and are combined into a single beam 216 by birefringent crystal 214A. Beam 216 is subsequently focused by lens 238A onto waveguide 3.

Birefringent crystal 226 plays an important role in guiding light from waveguides 202a and 202b to waveguide 203. Since light guiding device 242 bends beams 216A and 216B by the angle $\phi$, beams 216A and 216B travel laterally (in the negative y-direction) as well as longitudinally (in the negative z-direction) after they leave device 242. This lateral travel is compensated by crystal 226.

To be precise, beams 216A and 216B are offset a distance f by birefringent crystal 226. The distance along the y-axis between the point where beam 216B enters angle modifier 242 and waveguide 203 is $d_2$. The distance along the y-axis between waveguide 201 and the point where beam 214A leaves angle modifier 242 is $d_1$. The vertical or y-axis distance between waveguide 201 and waveguide 203 is t. The relation between these quantities is:

$$f = d_1 + d_2 - t. \tag{3}$$

This equation teaches how to design crystal 226 to have the correct offset f given the other parameters of circulator 200, i.e., when $d_1$, $d_2$, and t are known.

In an alternative embodiment, the apparatus is designed in such a way that $d_1+d_2=t$. Equation (3) then implies that f=0, which means that birefringent crystal 226 may be eliminated completely from the design. Angles θ and φ are each preferably between 1° and 3° and the sum of angles θ and φ is preferably between 2° and 6°.

Variations of light guiding device 242 are also possible. For instance, in another embodiment, beam 214A is extraordinary and beam 214B is ordinary in crystal 220A.

Figure 2A:
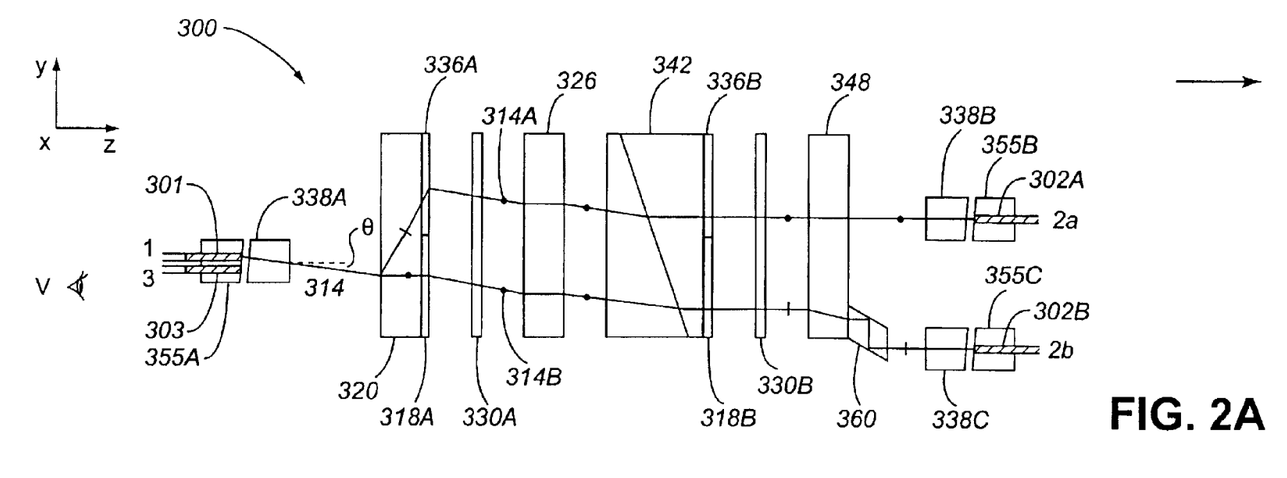
FIGS. 2A and 2B illustrate a side view of a circulator in accordance with another embodiment of the invention, FIG. 2A showing a forward beam path through the device and FIG. 2B showing a reverse beam path through the device.
Figure 2B:
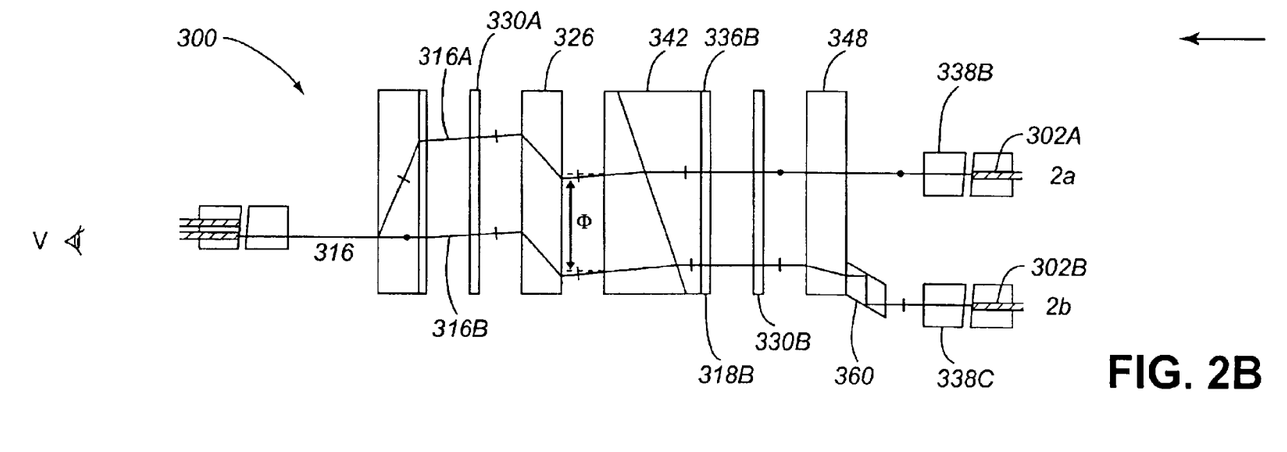

It will be appreciated that the relative orientations and relative positions of some components may be changed without affecting the operation of the circulator. For example, FIGS. 2A and 2B show a modified version of circulator 200, shown as circulator 300. In this circulator the second birefringent crystal shown as 226 in FIGS. 1A and 1B is here shown as birefringent crystal 326 and is place before angle modifier 342 rather than after the angle modifier. Further, an additional birefringent (walk-off) crystal is provided at the end of the optical path to further separate the two light beams from each other before they exit into ports 2a and 2b. Finally, in this embodiment, a half wave plate 340 is provided to make the polarizations of the beams exiting by ports 2a and 2b parallel.

Waveguide 301 is inserted into a first glass tube 355A. A second waveguide 302a is inserted into a second glass tube 355B and a third waveguide 302b is inserted into a third glass tube 355C. A fourth waveguide 303 is inserted into the first glass tube 355A, adjacent to waveguide 301, so that waveguide 301 and 303 are parallel. Waveguide 301 emits a light beam 314 from port 1 that is collimated and redirected at an angle θ with respect to the z-axis by a first lens 338A. Lens 338A also causes beam 314 to make an angle θ with respect to the z-axis. Beam 314 then passes through a first birefringent crystal (y-walk-off crystal) 320 that divides beam 314 into two beams having orthogonal polarizations, specifically beams 314A and 314B. Beam 314A, polarized along the y-z plane, enters a first half wave plate 336A and then passes through a Faraday rotator 330A, resulting in the rotation of the polarization of beam 314A by 90° into the x-axis. Beam 314B, meanwhile, enters a second half wave plate 318A, positioned below first half wave plate 336A followed by the first, the net effect being to leave the polarization of beam 314B unaltered. Beams 314A and 314B then enter a second birefringent crystal (y-walk-off crystal) 326. The optical axis of crystal 326 is oriented such that beams 314A and 314B are ordinary rays in crystal 326 and thus remain undeflected.

At this point beams 314A and 314B still propagate at angle θ with respect to the z-axis as they exit birefringent crystal 326. The beams 314A and 314B are refracted as a result of passing through angle modifier 342 and emerge parallel to each other, along the z-axis. Next, beam 314A passes through a half wave plate 336B followed by Faraday rotator 330B, resulting in no net effect on the polarization of beam 314A, which remains polarized in the x-direction. Meanwhile, beam 314B enters a half wave plate 318B followed by Faraday rotator 330B, the net result being that beam 314B is now polarized in the y-direction.

Next beams 314A and 314B enter a third birefringent crystal (y-walk-off) 348 which further splits apart the two beams, with beam 314B being walked off in the y-direction. Beam 314B continues through prism 360 to create a greater separation between the beams 314A and 314B. Prism 360 first deflect second light beam 314B by 90° and then deflects the second light beam 314B by 90° back after the desired separation along the y-axis has been achieved between beams 314A and 314B. Beams 314A and 314B emerge parallel to each other with orthogonal polarizations. Beam 314A is focused by a second lens 338B (preferably a GRIN lens) and enters waveguide 302a. Beam 314B is focused by a third lens 338C (preferably a GRIN lens) and enters waveguide 302b.

Alternatively, if it desired to have the two beams of light polarized parallel to each other, and additional half wave plate can be inserted as described above.

Light entering the circulator from ports 2a and 2b must be channeled into port 3. This reverse sequence is shown in FIG. 2B. Beams 316A and 316B exit from ports 2a and 2b, respectively, through waveguides 302a and 302b, respectively. Beams 316A and 316B are polarized parallel to the x-axis and the y-axis respectively, as indicated in FIG. 2B. The beams 316A and 316B are collimated by lenses 338B and 338C, respectively.

Beam 316B enters prism 360 which laterally displaces the beam 316B. Next beams 314A and 314B enter the third birefringent crystal 348 which further serves to laterally displace beam 316B closer to beam 316A.

Beam 316A enters Faraday rotator 320B, which rotates the polarization of beam 316A by 45° counterclockwise with respect to viewpoint V. Then beam 316A enters half wave plate 316B, which rotates the polarization of beam 316A by another 45° counterclockwise with respect to viewpoint V. Meanwhile the polarization of beam 316B is rotated by 45° counterclockwise with respect to viewpoint V by Faraday rotator 320B. The polarization of beam 316B is then rotated back 45° clockwise with respect to viewpoint V by half wave plate 318B. Therefore, just before beams 316A and 316B enter angle modifier 342, they are both polarized in the y-direction.

Both beams 316A, 316B then enter the angle modifier, shown here as a Wollaston prism 342. Beams 316A and 316B first enter the second birefringent plate of the angle modifier 342. The optic axis OA2 of this second birefringent plate is parallel to the polarizations of beams 316A and 316B. Beams 316A and 316B are therefore extraordinary rays within this second birefringent plate, but are undeflected since they are normally incident upon the second birefringent plate. Upon leaving the second plate and entering the first plate, however, beams 316A and 316B become ordinary rays, since their polarizations are perpendicular to the optic axis OA1 of the second plate. Beams 316A and 316B therefore refract upon entering the first plate due to the difference between refraction indices $n_e$ and $n_o$. When beams 316A and 316B exit this first birefringent plate, they refract again to exit at angle φ with respect to the z-axis.

Beams 316A and 316B enter birefringent crystal 326, where they are extraordinary rays and are offset in the y-direction.

After leaving the birefringent crystal 326, beam 316A then passes through Faraday rotator 320A and half wave plate 316A with no net effect on its polarization. Beam 316B passes through Faraday rotator 320A and half wave plate 318A; the result is a rotation of the polarization of beam 316A by 90°. Beams 316A and 316B now have orthogonal polarizations with respect to each other. They are then combined into a single beam 316 by birefringent crystal 320. Beam 316 is subsequently focused by lens 338A onto waveguide 3.

FIGS. 3A, 3B, 3C, and 3D show another circulator 400 in accordance with one aspect of the invention. The general construction and operation of this embodiment is analogous to that of circulators 100, 200, and 300, with some variations as now discussed. In contrast to the other embodiments described thus far, circulator 400 is designed such that the first birefringent crystal 420 has a walk-off direction perpendicular to angle θ. Thus, the side view of this embodiment (FIGS. 3A and 3C) show the effects of this angular (θ) displacement (as well as the spatial displacement the birefringent crystal 426); whereas, in the top view of the embodiment, illustrated in FIGS. 3B and 3D, the walk-off effects of birefringent crystal 420 are seen.

Figure 3A:
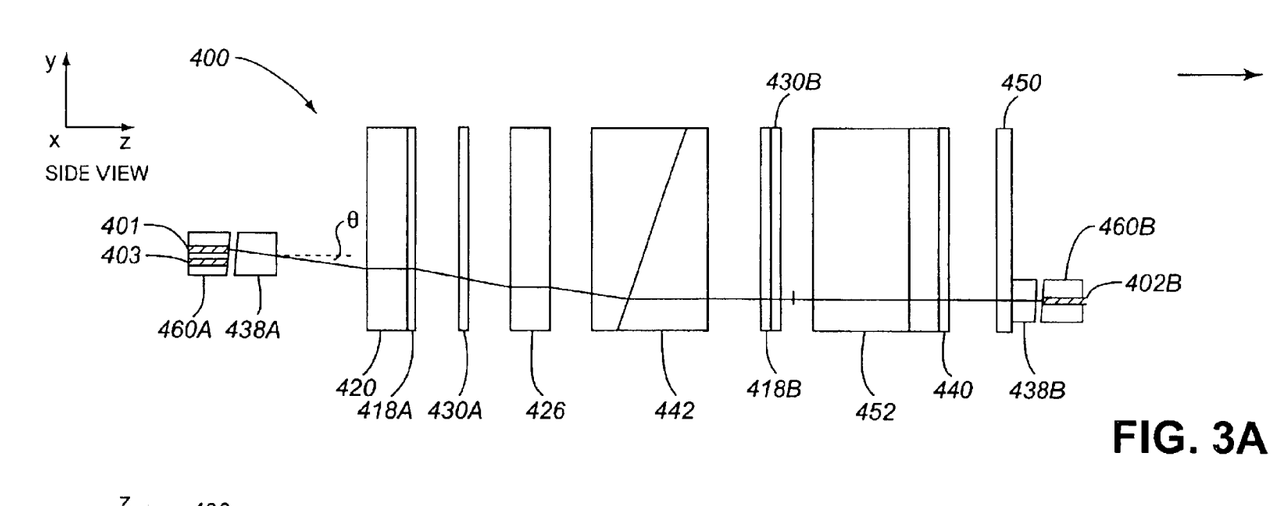
FIG. 3A is a top plan view and FIG. 3B is a side view of a circulator in accordance with the invention, showing a forward beam path through the device.
Figure 3B:
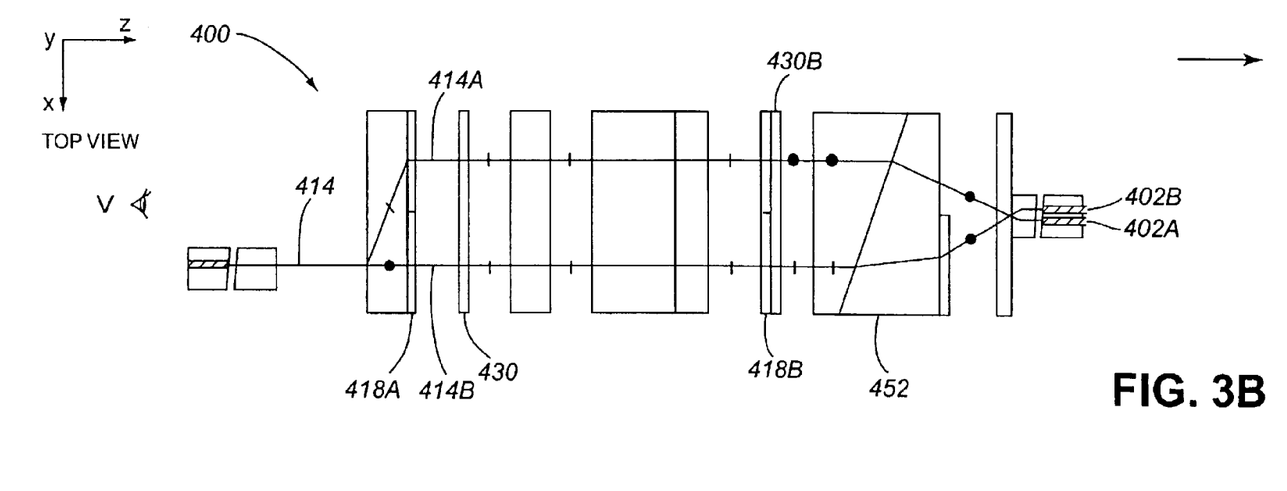

A first and fourth waveguide 401 and 403 are inserted into a glass tube 460A parallel to each other. A second and third waveguide 402b and 402a are inserted into a second glass tube 460B parallel to each other. However, unlike the previous embodiments, in this embodiment the plane in which waveguides 401 and 403 are placed is perpendicular to the plane in which waveguides 402a and 402b are placed.

Another difference is that after passing through the second set of half wave plates 436B and 418B and the second Faraday rotator 430B, a second angle modifier 452 is used, perpendicular to the first angle modifier 442.

Thus, in operation light emitted from waveguide 401 is collimated by lens 438A. As shown in a top view illustrated in FIG. 3B, the beam is split in the x-z plane into two orthogonal beams 414A and 414B upon passing through a first birefringent crystal 420 (x-walk-off). Beam 414A then passes through a first half wave plate 436A and a Faraday rotator 430A with a net rotation of 0°. Beam 414B passes through half wave plate 418A and Faraday rotator 430A with a net rotation of 90°. Both beams 414A and 414B, polarized parallel to the x-axis, pass without any effect, as seen from this top view, through a second birefringent crystal 426 (y-walk-off), and angle modifier 442. After beam 414A and 414B pass through the set of half wave plates 436B and 41B and the Faraday rotator 430B, beam 414B remains polarized parallel to the x-axis and beam 414A is rotated by 90° clockwise relative to viewpoint V.

Figure 3C:
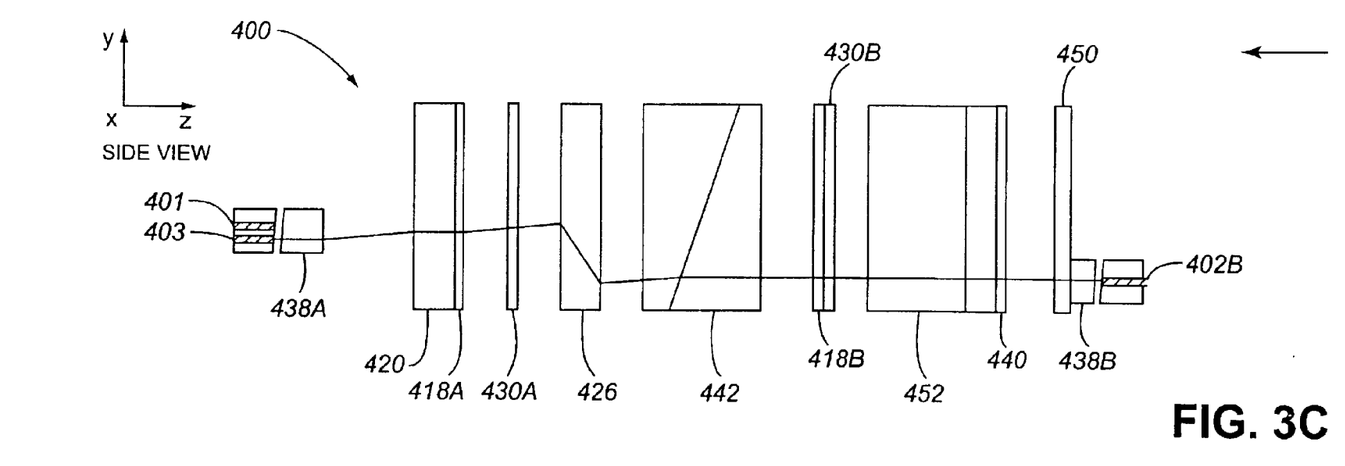
FIG. 3C is a top plan view and FIG. 3D is a side view of the same circulator illustrated in FIGS. 3A and 3B showing a reverse beam path through the device.
Figure 3D:
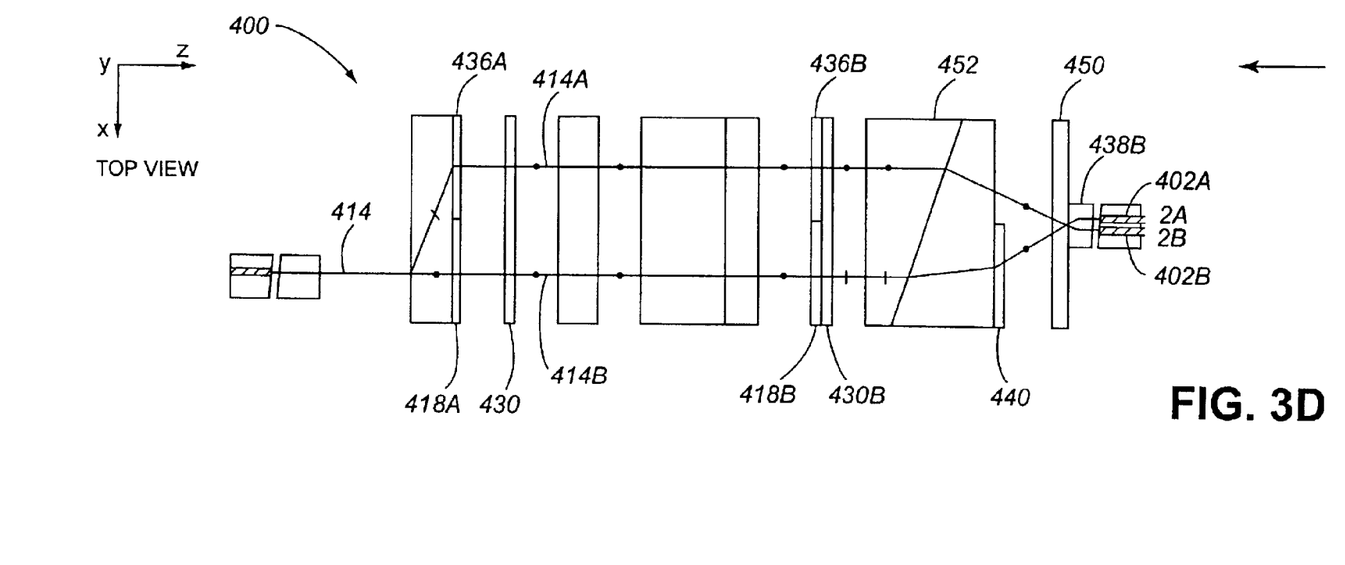

Beams 414A and 414B enter into the first plate of angle modifier 452 on the normal and are undeviated. Upon entering the second plate of angle modifier 452, beam 414A is refracted toward the normal and beam 414B is refracted away from the normal resulting in a convergence of the two beams. On leaving the second plate of the angle modifier 452, both beams are refracted away from the normal, so that their convergence increases. Beam 414B then enters a half wave plate 440 which rotates the polarization of the beam by 90° clockwise a seen from viewpoint V. Thus, the polarizations of both beams 414A and 414B are parallel to the y-axis at this point. Both beams 414A and 414B continue to converge as they pass through polarizer 450, which serves to increase the extinction coefficient. The beams 414A and 414B are focused by lens 438B onto waveguides 402a and 402b, respectively. In the reverse direction, beams 414A and 414B retrace their paths with respect to the top view, as shown in FIG. 3C.

As shown in a side view, illustrated in FIG. 3A, lens 438A serves not only to collimate the light emitted from waveguide 401 as discussed above, but also serves to displace the beam at an angle θ from the z-axis. The light beams 414A and 414B continue to travel at an angle θ until reaching angle modifier 442 which serves to render the beams parallel to the z-axis. In the reverse direction, illustrated in FIG. 3C, angle modifier 442 serves to offset the beams 416A and 416B from the z-axis. After passing through angle modifier 4442 in the reverse direction, the polarizations of beam 416A and 416B are parallel to the y-axis, and thus both beams are extraordinary rays when passing through birefringent crystal 426 (y-walk-off) and 'walk-off' in the y-direction. After exiting birefringent crystal 426, they continue to travel at an angle. Beam 416 is focused by lens 438A onto waveguide 403.

Figure 4A:
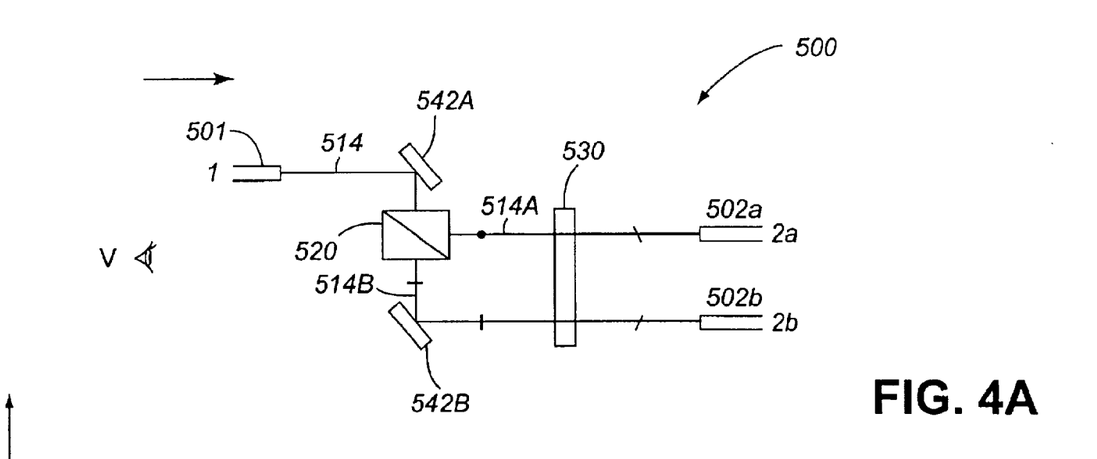
FIGS. 4A and 4B illustrate a side view of a circulator in accordance with another embodiment of the invention, FIG. 4A showing a forward beam path through the device and FIG. 4B showing a reverse beam path through the device.
Figure 4B:
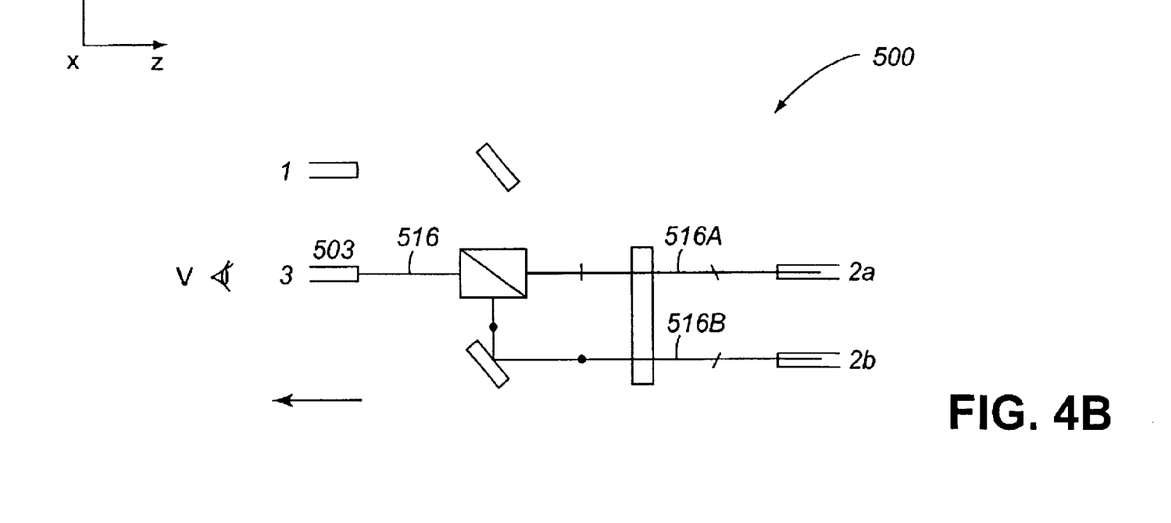

FIGS. 4A and 4B show another circulator 500 in accordance with another embodiment of the invention. Rather than using an x-axis birefringent walk-off crystal as the beam-splitting/-coupling module, as exemplified in FIGS. 1 to 3, this circulator employs a polarization beam splitter which splits the unpolarized light beam from port 1 into two orthogonally polarized beams. The two beams emerge not only at orthogonal polarizations, but also at orthogonal angles to each other. Further, the angle modifier is not a Wollaston prism as exemplified in FIGS. 1 to 3, but is an inverting reflector 542A and 542B. The inverting reflector may be a prism reflector or a mirror.

Thus, light emitted from port 1 through waveguide 501 propagates forward as beam 514. The beam is deflected at approximately 90° by inverting reflector 542A toward the polarization beam splitter 520. The polarization beam splitter 520 splits the incoming beam into two beams of orthogonal polarization oriented at 90° to each other. An example of such a polarization beam splitter is a Foster prism. In the embodiment shown here, beam 514A emerges at a 90° angle with reference to beam 514A when it enters the polarization beam splitter 520. The polarization of beam 514 is oriented along the x-axis as shown by a dot in FIG. 4A. Beam 514B continues through the polarization beam splitter 520. Following its emergence from polarization beam splitter 520, beam 514B reaches inverting reflector 542B where it is deflected by 90° and emerges parallel to beam 514A with its polarization oriented along the y-axis. Both beams then enter Faraday rotator 530 which rotates their polarizations by 45° in the clockwise direction. Beams 514A and 514B exit into waveguides 502a and 502b, respectively, with their polarizations oriented orthogonally with respect to each other.

In the reverse direction, light beams of orthogonal polarization 516A and 516B enter the circulator from ports 2a and 2b through waveguides 502a and 502b, respectively. After passing through Faraday rotator 530, the polarizations of the light beams 516A and 516B are each rotated by 45° clockwise with reference to view V. Light beam 516B is then deflected by 90° by inverting reflector 542B and is thus oriented toward polarization beam splitter 520. The polarization beam splitter 520 couples light beam 516B and light beam 516A which then emerges as light beam 516 and enters waveguide 503.

The use of a single Faraday rotator 530 for both beams is not intended to limit the invention. For instance, each beam may be provided with its own Faraday rotator.

Though not shown in FIGS. 4A and 4B, collimating lenses are preferably used to collimate the light which enters and exits the circulator from waveguides 501, 502a, 502b, and 503, as described with regard to circulators 200, 300, and 400.

The inverting reflectors 542A and 542B are optional. If neither inverting reflector 542A nor 542B were used, the ports 1, 2a, 2b, and 3 would be arranged differently, such that ports 1 and 2a lie in an axis, perpendicular to an axis formed between ports 2b and 3. If only one of inverting reflectors 542A or 542B were used, the orientation of the ports relative to each other would be arranged to accommodate the necessary change in geometry of the light paths.

Furthermore, an isolator may be used in the path of light beam 514 after it exits from waveguide 501 and preferably after it passes through a collimating lens. An isolator core operates to propagate light in a forward direction along a path while inhibiting the transmission of light in the reverse direction along the same path. In addition, an isolator is preferably used in the path of light beam 516 after it exits from polarizing beam splitter 520 before it exits via waveguide 503. More preferably, the light beam 516 passes through the isolator and then through a collimating lens before exiting via waveguide 503.

Polarizers may also be used, placed before waveguides 502a and 502b in the path of light beams 514A and 514B, respectively, to obtain high extinction coefficients. If collimating lenses are also used, the polarizers would be used after Faraday rotator 530 and before the collimating lens in the forward direction of propagation.

As described with reference to circulators 100, 200, 300, and 400, additional half wave plates may be used directly before or after the Faraday rotator in various arrangements depending on the relative angles of polarization of beams 514A, 514B, 516A, and 516B, as desired.

The present invention should not be considered limited to the particular examples described above, but rather should be understood to cover all aspects of the invention as fairly set out in the attached claims. Various modification, equivalent processes, as well as numerous structures to which the present invention may by applicable will be readily apparent to those of skill in the art to which the present invention is directed upon review of the present specification. The claims are intended to cover such modifications and devices.

We claim:

1. An optical circulator comprising:
    a plurality of ports, wherein an input port is disposed to launch unpolarized light into the circulator, two sequential ports are disposed to receive polarized light, and an exit port is disposed to receive unpolarized light;
    a beam-splitting and -combining element, configured to split a beam of light propagating in a forward direction along a first light path, into a second and a third light path, the second and third light paths having mutually-orthogonal polarization, said splitting/combining element also configured to combine mutually-orthogonally-polarized light beams propagating in the reverse direction along a fourth and a fifth light path into a single beam of light propagating along a sixth light path; and
    a non-reciprocal polarization rotator, configured to rotate polarization directions of light propagating along the second and third light paths and to rotate polarization directions of light propagating along the fourth and fifth light paths; and an angle modifier, configured to modify the angle of propagation of a light beam.

2. The optical circulator of claim 1, wherein the angle modifier is configured to deflect a light beam propagating in a forward direction toward the splitting/combining element.

3. The optical circulator of claim 2, further comprising a second angle modifier, configured to deflect light travelling along the third light path.

4. The optical circulator of claim 3, wherein the angle modifiers are individually selected from the group consisting of mirrors and prisms.

5. The optical circulator of claim 1, wherein the angle modifier comprises first and second tapered plates of birefringent material, the first and second plates having perpendicular optical axes.

6. The optical circulator of claim 1, wherein the input and exit ports are provided with a first lens, and each of the two sequential ports are provided with second and third lens, respectively, wherein the lenses are used to collimate and focus light entering and exiting the optical circulator.

7. The optical circulator of claim 1, wherein the input and exit ports are provided with a first lens and the two sequential ports are provided with a second lens, wherein the lenses are used to collimate and focus light entering and exiting the optical circulator.

8. The optical circulator of claim 1, further comprising:
    a birefringent translating unit configured to laterally displace a light beam propagating therethrough with a first polarization direction and to transmit without lateral displacement a light beam having a second polarization direction orthogonal to the first polarization direction.

9. The optical circulator of claim 1, further comprising a half wave plate, adapted to rotate the polarization of a beam by approximately 90°.

10. The optical circulator of claim 1, wherein the non-reciprocal polarization rotator is configured to render two parallel polarizations perpendicular and two perpendicular polarizations parallel with respect to each other, and is selected from the group consisting of two half wave plates and one Faraday rotator, one half wave plate and one Faraday rotator, and a Faraday rotator.

11. An optical circulator comprising:
    a plurality of ports, wherein an input port is disposed to launch unpolarized light into the circulator, two sequential ports are disposed to receive polarized light, and an exit port is disposed to receive unpolarized light;
    a first lens, configured to collimate a first light beam propagating in a forward direction from the input port, and configured to focus a sixth light beam into the exit port;
    a beam-splitting and -combining element, configured to split the first beam of light into a second and a third beam, the second and third beams having mutually-orthogonal polarization, said splitting/combining element also configured to combine mutually-orthogonally-polarized fourth and fifth light beams propagating in the reverse direction from the two sequential ports into the single sixth beam;
    a first non-reciprocal polarization rotator, configured to rotate polarization directions of the second and third light beams and to rotate polarization directions of the fourth and the fifth light beams such that two parallel polarizations are rendered perpendicular and two perpendicular polarizations are rendered parallel to each other;
    an angle modifier, configured to modify the angle of propagation of a light beam, comprising first and second tapered plates of birefringent material, the first and second plates having perpendicular optical axes, adapted to render the second and third light beams parallel to the longitudinal axis;
    a second non-reciprocal polarization rotator, configured to rotate polarization directions of light propagating along the second and third light paths, and to rotate polarization directions of light propagating along the fourth and fifth light paths, such that two parallel polarizations are rendered perpendicular and two perpendicular polarizations are rendered parallel to each other; and
    a second lens, adapted to focusing the second light beam into one of said sequential ports, and adapted to collimating the fourth light beam emanating from the one of said sequential ports.

12. The optical circulator of claim 11, wherein the first lens is adapted to impart an angle $\theta$ to the first light beam with respect to a longitudinal axis defined by the direction of propagation of said light beam when the first light beam is launched into the circulator from the input port.

13. The optical circulator of claim 11, wherein the angle modifier is adapted to impart an angle of φ with respect to the longitudinal axis to the fourth and fifth light beams.

14. The optical circulator of claim 11, further comprising a birefringent translating unit configured to laterally displace a light beam propagating therethrough with a first polarization direction and to transmit without lateral displacement a light beam having a second polarization direction orthogonal to the first polarization direction, adapted to laterally displace the fifth and sixth beams.

15. The optical circulator of claim 11 further comprising a birefringent block adapted to diverging the second and third light beams with respect to each other and adapted to converging the fourth and fifth light beams with respect to each other.

16. The optical circulator of claim 15, further comprising a prism adapted to laterally displace the third beam.

17. The optical circulator of claim 11, wherein the input and exit ports are located adjacent to each other and the two sequential ports are located adjacent to each other, and wherein the plane the first and fourth ports is parallel to the plane containing the two sequential ports.

18. The optical circulator of claim 11, further comprising a half wave plate, adapted to rotate the polarization of a beam by approximately 90°.

19. The optical circulator of claim 11, wherein the non-reciprocal polarization rotators are individually selected from the group consisting of two half wave plates and one Faraday rotator, one half wave plates and one Faraday rotator, and a Faraday rotator.

20. The circulator of claim 11, further comprising a third lens, adapted to focusing the third light beam into the other of said sequential third ports, and adapted to collimating the fifth light beam emanating from the other of said sequential ports.

21. An optical circulator comprising:
a plurality of ports, wherein an input port is disposed to launch unpolarized light into the circulator, two sequential ports are disposed to receive polarized light, and an exit port is disposed to receive unpolarized light;
a first lens, configured to collimate a first light beam propagating in a forward direction from the input port, and configured to focus a sixth light beam into the fourth port;
a beam-splitting and -combining element, configured to split the first beam of light into a second and a third beam, the second and third beams having mutually-orthogonal polarization, said splitting/combining element also configured to combine mutually-orthogonally-polarized fourth and fifth light beams propagating in the reverse direction into the single sixth beam;
a first non-reciprocal polarization rotator, configured to rotate polarization directions of the second and third light beams and to rotate polarization directions of the fourth and the fifth light beams such that two parallel polarizations are rendered perpendicular and two perpendicular polarizations are rendered parallel to each other;
a first angle modifier, configured to modify the angle of propagation of a light beam, comprising first and second tapered plates of birefringent material, the first and second plates having perpendicular optical axes, adapted to render the second and third light beams parallel to the longitudinal axis;
a second non-reciprocal polarization rotator, configured to rotate polarization directions of light propagating along the second and third light paths, and to rotate polarization directions of light propagating along the fourth and fifth light paths, such that two parallel polarizations are rendered perpendicular and two perpendicular polarizations are rendered parallel to each other, such that two parallel polarizations would be rendered perpendicular and two perpendicular polarizations would be rendered parallel to each other;
a second angle modifier, configured to modify the angle of propagation of a light beam, comprising first and second tapered plates of birefringent material, the first and second plates having perpendicular optical axes, adapted to converge the second and third light beams, and to render parallel the fourth and fifth light beams; and
a second lens, adapted to focus the second and third light beams into the two sequential ports, respectively, and adapted to collimate the fourth and fifth light beams emanating from the two sequential ports, respectively.

22. The optical circulator of claim 21, wherein the first lens is adapted to impart an angle θ to the first light beam with respect to a longitudinal axis defined by the direction of propagation of said light beam when it is launched into the circulator from the input port.

23. The optical circulator according to claim 22, wherein the plane containing the second and third beams is perpendicular to the plane containing the angle θ.

24. The optical circulator of claim 21, wherein the angle modifier is adapted to impart an angle of φ with respect to the longitudinal axis to the fourth and fifth light beams.

25. The optical circulator of claim 21, further comprising a birefringent translating unit configured to laterally displace a light beam propagating therethrough with a first polarization direction and to transmit without lateral displacement a light beam having a second polarization direction orthogonal to the first polarization direction, adapted to laterally displace the fifth and sixth beams.

26. The optical circulator of claim 21, further comprising a polarizer.

27. The optical circulator of claim 21, wherein the first and fourth ports are located adjacent to each other and the second and third ports are located adjacent to each other, and wherein the plane of the first and fourth ports is parallel to the plane containing the second and third ports.

28. The optical circulator of claim 21, further comprising a half wave plate, adapted to rotate the polarization of a beam by approximately 90°.

29. The optical circulator of claim 21, wherein the non-reciprocal polarization rotators are individually selected from the group consisting of two half wave plates and one Faraday rotator, one half wave plates and one Faraday rotator, and a Faraday rotator.

* * * * *

UNITED STATES PATENT AND TRADEMARK OFFICE
CERTIFICATE OF CORRECTION

PATENT NO. : 6,757,451 B2
DATED : June 29, 2004
INVENTOR(S) : Chang et al.

It is certified that error appears in the above-identified patent and that said Letters Patent is hereby corrected as shown below:

Column 3,
Line 66, "crystal 202" should read -- crystal 220 --

Column 7,
Line 19, "and is place" should read -- and is placed --

Column 8,
Line 10, "and additional" should read -- an additional --
Line 24, "Faraday rotator 320B" should read -- Faraday rotator 330B --
Line 27, "plate 316B" should read -- plate 336B --
Line 31, "rotator 320B" should read -- rotator 330B --
Lines 56 and 58, "rotator 320A" should read -- rotator 330A --
Line 57, "plate 316A" should read -- plate 336A --

Column 9,
Line 64, "beams 416A and 416B" should read -- beams 414A and 414B --
Line 65, "modifier 4442" should read -- modifier 442 --
Line 66, "beam 416A and 416B" should read -- beam 414A and 414B --

Column 10,
Line 3, "beam 416" should read -- beam 414 --
Line 3, "beam 416" should read -- beam 414 --
Line 25, "beam 514A" should read -- beam 514 --

Column 11,
Line 46, "paths and to" should read -- paths to --

Signed and Sealed this

Twenty-sixth Day of April, 2005

JON W. DUDAS
*Director of the United States Patent and Trademark Office*